May 11, 1948.     R. C. SUTTON     2,441,340
CONTROL FOR ELECTRIC TRACK SWITCHES
Filed March 28, 1946

RUFUS C. SUTTON
INVENTOR.

BY John L. Milton
Attorney.

Patented May 11, 1948

2,441,340

UNITED STATES PATENT OFFICE 2,441,340

CONTROL FOR ELECTRIC TRACK SWITCHES

Rufus C. Sutton, Pittsburgh, Pa.

Application March 28, 1946, Serial No. 657,715

1 Claim. (Cl. 246—227)

My invention relates to improvements in the control of electrically-operated track switches for directing the course to be traveled by electrically operated vehicles.

The main object of my invention is to dispense with movable elements and/or contact members associated with the trolley conductor employed in connection with a trolley collector for diverting current flowing therefrom to the propulsion motor of a vehicle for actuating and controlling an electrically operated switch point for directing the course of travel of the vehicle. Apparatus employing said movable elements and contact members are referred to in the industry and patents as "trolley pan," "trolley switch" and "contactors."

An object of my invention is to provide an improved electrically controlled system to insure more definite and enduring operation of the apparatus employed in a system for controlling and actuating electric switch point apparatus.

Another object of my invention resides in providing control apparatus of an enduring type that will minimize service calls to the trolley wires where circuits leading therefrom are employed to actuate track switch point operating apparatus.

Figure 1:
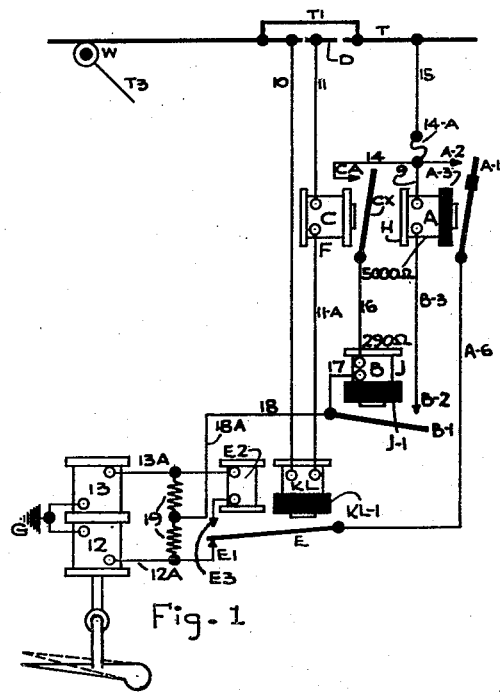
Figure 2:
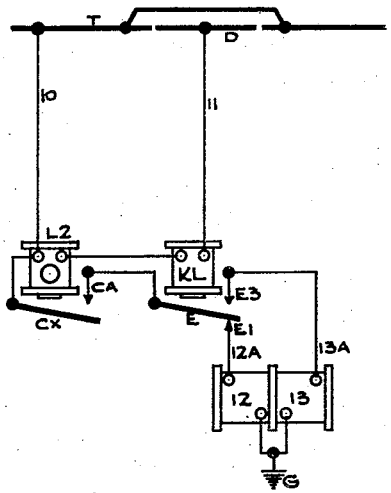
Figure 3:
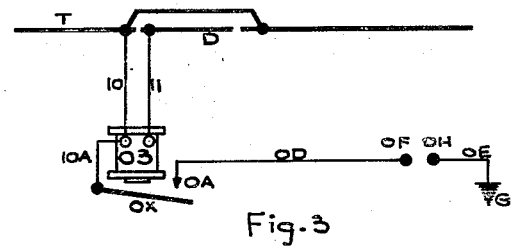
Figure 4:
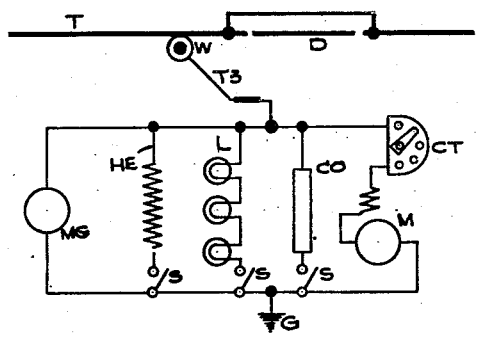

In the accompanying drawings:

Figure 1 is a circuit diagram showing the circuits and apparatus of one embodiment of my invention, and Figure 2 is a schematic drawing illustrating a simplified circuit for the prime purpose of providing a ready understanding of the incident invention, and Figure 3 is a schematic drawing illustrating one embodiment of my invention for use in connection with signal circuits, and Figure 4 is a schematic drawing illustrating the conventional circuits usually employed for operating standard equipment found in an electrically operated vehicle. These circuits are taken into consideration in describing the operation of the apparatus illustrated in the preceding figures.

My invention is primarily intended for use with those vehicles that are operated by means of electrical current collected by a trolley wheel or shoe, from an overhead trolley-conductor, although it will be evident that my invention can be used with vehicles that are electrically operated by other methods.

Referring to Figure 4, the character T designates a trolley conductor usually connected to the positive terminal of a source of power. Characters M, CO, LG, HE and MG designate, respectively, vehicle equipment known as propulsion motor, compressor, lights, heaters and motor generator sets as installed on all PCC cars (President Conference Cars). It should be noted that each of the items mentioned is under control of a switch for discontinuing the use thereof except the MG set, which is permanently connected to the trolley and return ground circuit whenever the vehicle is in service. All of these elements, except the power motors, are referred to hereinafter as the "auxiliaries" of the vehicle. These are taken into account in explaining the principles of operation in the preferred embodiment of my invention. In Figure 4, CT designates "controller" for use by the motorman in the operation of the propulsion motor while the characters S designate switches for controlling the other auxiliaries on the vehicle.

As illustrated in Figure 4, the aforesaid propulsion motor and auxiliaries are each electrically connected so as to receive operating current from the positive trolley-conductor T through the trolley wheel or collector and the negative-conductor of the source of power indicated by the conventional ground or negative potential symbol G. For those familiar with the art, it will be obvious that the connection to the negative conductor may be provided through the wheels of the vehicle and track rails, or for a second collector engaging a negative conductor paralleling the positive conductor the latter arrangement is known as the double trolley system.

To provide means for diverting current from the normal operating circuit for the propulsion motor, i. e. from the trolley conductor to the ground or return circuit, an insulated section D of the trolley conductor has been utilized in place of the conventional trolley pan, trolley switch, trolley contactor, et cetera.

This invention utilizes the principle of energizing a circuit and operating relays upon the engagement of a trolley collector with the insulated section of the trolley conductor to provide an automatic operation of certain other relays in another circuit operatively associated therewith after initiating current has been applied to said other relays which establish a flow of operating current to one of two solenoids of the electrically operated switch point apparatus.

All PCC cars are equipped with a continuously operating MG set to provide current for a storage battery carried by the vehicle, which current is used for lights and signals. The incident invention has been evolved to utilize the novel condition of an operating vehicle continuously drawing current during the entire time it is in service. To utilize this condition, an additional relay (L2, Figure 2) responsive to the current drawn by the MG set as the collector engages the insulated section of the trolley conductor has been provided. This additional relay initiates the excitation of other relays which in turn apply and interrupt the current drawn by one or the other two solenoids operatively associated with the track switch operating apparatus. This additional relay is placed in series with the selective relay (KL) employed in any of the conventional "power on" and "power off" electrically operated switch point operating systems, provided a MG set or other continuously operating current consuming apparatus is carried by all vehicles traversing electric railways having the trolley conductor provided with the insulated section adverted to above.

With reference to Figure 1, character T designates a trolley-conductor, D an insulated section, while T—1 designates a loop bridging the insulated section. Wires 10, 11A and 11 connect the windings of relays KL and F in series with the trolley conductor T and insulated section D so that the current flowing to the vehicle through the trolley T3 and trolley collector wheel W, will traverse said windings. In one embodiment of my invention, the winding of KL consists of a few turns of coarse wire, while C consists of several turns of coarse wire and the respective armature of these relays are so organized that armature E will be raised from back contact E1 to front contact E3 only when current in excess of sixty five amperes, while armature CX is so constructed it will respond to all amperages equal to or in excess of that drawn by the MG set, thereby actuating CX armature each and every time a trolley wheel of a vehicle engages the insulated section. As adverted to above, provision for the functioning of relay F, just explained, constitutes the improvement over all earlier power on and power off systems for electrically operating the switch point of electric railways for directing the course of the vehicle, or obviously the tongue of an overhead switch frog either independently of or simultaneously with the track switch.

In the power on and power off circuit chosen from the many earlier systems for disclosing a preferred embodiment of my invention, I have shown in Figure 1 a circuit substantially in accordance with Figure 1 in Patent 2,302,898, issued November 24, 1942, to S. S. Stolp.

Again referring to Figure 1, and especially to contact-armatures that are actuated by the windings on relays F and KL: the 65 amperes required to lift armature E from engagement with contact E1 is in excess of the current drawn by any combination of the auxiliaries, therefore, when the vehicle traverses the insulated section with power on the operating current flowing to the track switch point operator will place solenoid 13 in the circuit for receiving said operating current, provided the motor is drawing current. Obviously, it follows that when the current drawn by the vehicle is below the critical stage, 65 amperes, armature E will remain engaged with the back contact E1 thereby placing winding 12 in circuit for receiving the operating current flowing to the track switch operating solenoid.

As stated above, armature CX of relay F engages contact CA each time the collector engages the insulated section D. Incident to this operation the following circuit is closed from trolley conductor T, wire 15, fuse 14—A, wire 14, contacts CA, CX, wire 16, winding B of relay J, wires 17, 18, 18A, resistor 19, wires 12A, 13A and solenoids 12, 13, in multiple to ground. Simultaneously with the establishment of this circuit, armature B1 of relay J is raised to engage contact B2 energizing winding A of relay H through circuit established from trolley T, wire 15, fuse 14A, wire 9, winding A of relay H, wire B3, contact points B—2, B—1, wires 18, 18A, resistor 19, and wires 12A, 13A, solenoids 12, 13 in multiple to ground.

Incident to energizing relay H by reason of winding A being included in the circuit just traced, contact-armature A1 is brought into engagement with contact A2 thereby supplying operating current to operating solenoids 12 or 13 from trolley T through wire 15, fuse 14A, contacts A—2, A—1, wire A—6 to contact armature E and then through one or the other of the multiple circuits to ground, previously traced.

By reason of the appreciable difference in the resistance of coils A and B, viz. 5000 and 290 ohms, respectively, winding A is shunted out by contacts B1 and B2 during engagement of the current collector with the insulated section D and the energization of winding C as previously described.

The shunting of winding A is effective throughout the period in which the collector engages said insulated section, then by reason of copper slug J—1 on relay J, contacts B—1 and B—2 remain closed for an effective period even though the collector has traveled beyond the insulated section, and has reengaged the trolley conductor. During this period of engagement between contacts A—1 and A—2, the operating current flowing to the selected track switch solenoid continues to flow through the influence of copper slug A—3 on relay H.

It should be noted that relay KL is also equipped with copper slug KL—1 so that when current drawn by the vehicle through the collector holds armature E in engagement with the front contact E3, the period of engagement by these contacts is appreciably prolonged, also assisting the retention of armature E in contact with E—3 is holding electro-magnet E2, the winding of which is in circuit with wire 13A and solenoid 13. This electro-magnet definitely holds armature-contact E engaged with contact E3 during the engagement of contacts A—1, A—2, thereby protecting the track-switch operating apparatus against a false operation.

Another embodiment of my invention for use in operating and controlling electric track-switch operating apparatus is represented by the simplified circuit constituting Figure 2, in which the control feature for automatically interrupting the current has been omitted, i. e. the electrical apparatus and circuits employed for disconnecting the track switch solenoids from the source of power independently of the trolley collector and the engagement thereof with said insulated section. In this circuit, windings of relays L2 and KL are in series with trolley T and insulated section D through wires 10 and 11 in order that the trolley collector will draw current therethrough the same as with relays F and KL in Figure 1. Obviously, upon the presence of the collector on the insulated section, whether or not the vehicle is drawing power for the propulsion motor or auxiliaries, the contact-armature CX will always be brought into engagement with contact point CA through the influence of current flowing to the MG set.

When trolley switch contactors, trolley pans, et cetera, of the types equipped with members adapted for movement by the collector, are employed in connection with the electrical operation of switch point apparatus for directing the course of vehicles or the trolley collector thereon, slow speed travel, approximately from five to ten miles per hour, is required and in signal circuit similarly operated by the engagement of the overhead trolley collector with such movable members, occasional failures at high speeds in the order of 60 to 80 miles per hour have been impossible to overcome, even where high speed trolley switch contactors of the type shown in U. S. Patents 992,035 and 1,966,137 have been employed. These trolley switch contactors were especially constructed to provide an uninterrupted course for the trolley collector, referred to in the industry as having a "smooth underrun." This has reference to the engagement of the collector with the trolley conductor while traversing the section thereof equipped with the trolley contactor switch. However, incident to said engagement, the collector engages a strip or strips thereon to close or open a circuit. Deformed flanges of the current collector are produced by mechanical and electrical erosion incident to this engagement, mis-aligned collectors, due to bent trolley poles, are also contributing factors to failures. Even though the highest type of engineering skill has been employed for designing and corresponding talent for the manufacture and maintenance of the trolley switch contactors, sporadic failures have subordinated signaling systems employing trolley contactor switches to some other types of systems. A factor contributing to the successful operation of the various embodiments of this invention is the use of the active contact of the collector, the part that actually collects the current for the operation of the vehicle, for energizing the apparatus in the practice of this invention.

To provide dependable signaling apparatus at high speeds, one embodiment of my invention is shown in Figure 3 in which relay O3 similar to F and L2, in Figures 1 and 2, respectively, is shown. Here, the winding on relay O3 is proportioned so that contact-armature OX will engage contact OA dependably each time the trolley collector engages insulated section D and establishes a current in the winding of the said relay through wires 10, 11. Upon the engagement of OX and OA signal operating current will flow from trolley T, wires 10, 10A, contact-armature OX, contact OA, wide OD to terminal of a signaling apparatus (not shown), terminal OH, wire OE to ground.

Since the wiring diagram of this figure is presented on a schematic principle, it is to be understood that a broad range of electrically operated signaling apparatus can be connected to terminals OF, OH. Thus it will be perceived that various embodiments of the incident invention provide improved apparatus for accomplishing the objects adverted to at the outset of this specification and for the dependable operation of switch point and/or signal operating apparatus at higher speeds than attainable with conventional apparatus of the same general class.

It will be evident to those skilled in the incident art that various modifications may be made in the parts herein described and still fall within the scope of my invention, consequently, I wish to be limited only by the claim presented herein.

I claim:

In an electric railway, a trolley conductor; an insulated contact device adjacent the conductor constructed and arranged so that a collector entering the contact device will pass from the conductor onto the contact device and then return to the conductor in leaving the contact device; a pair of relays having their operating coils electrically connected in series between the trolley conductor and contact device, so that the relay coils are connected in series with the circuits of a railway vehicle when the current collector thereof engages the contact device; a fixed load of relatively low predetermined current value carried by the vehicle and constantly connected in circuit between the current collector and ground return; the operating coil of one of said relays adapted to operate in response to the relatively low predetermined current value of the fixed load carried by the vehicle, and the operating coil of the other said relays adapted to operate only in response to the relatively high current value of the propulsion motor circuits of the vehicle when the same are closed while the collector engages the said contact device; and electrical connections between the contacts of each the said relays, so that the circuit controlled by the operation of the contacts of the said one of said relays is dependent upon the selective operation of the contacts of the other of said other said relays.

RUFUS C. SUTTON.

REFERENCES CITED

The following references are of record in the file of this patent:

UNITED STATES PATENTS

| Number | Name | Date |
|---|---|---|
| 888,389 | Corey | May 19, 1908 |
| 2,302,898 | Stolp | Nov. 24, 1942 |